Jan. 10, 1956 G. A. WATROUS ET AL 2,730,419
FURNITURE SUPPORT
Filed Sept. 18, 1951 3 Sheets-Sheet 1
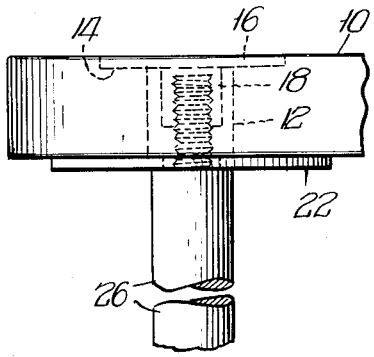
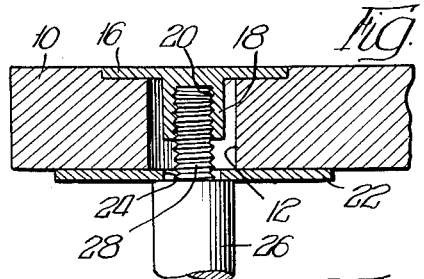
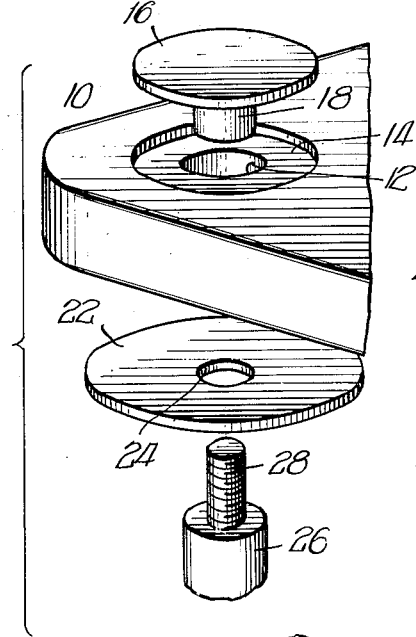
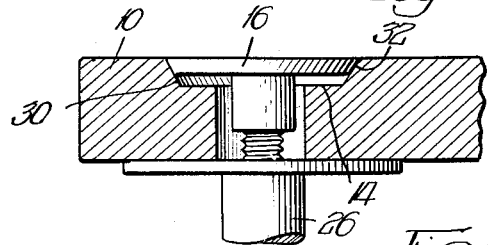
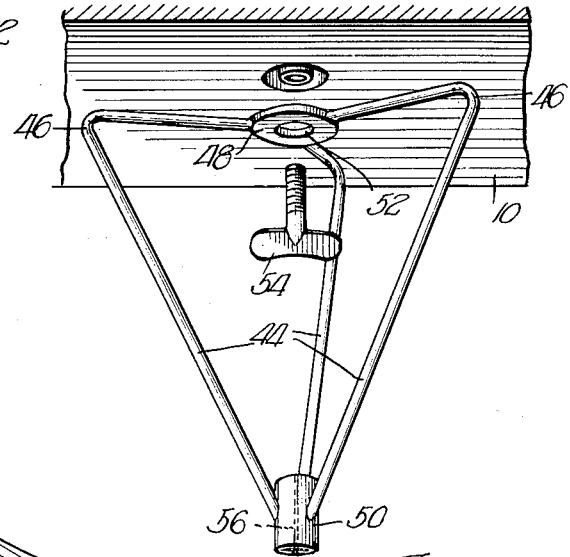
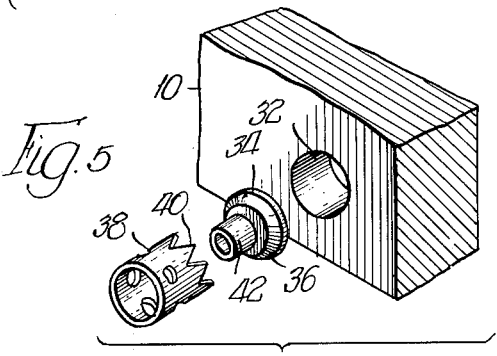
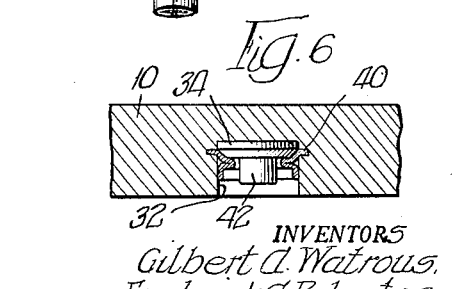
INVENTORS
Gilbert A. Watrous,
BY Frederick A. Roberton,
Wilkinson, Huxley, Byron & Hume
Attys

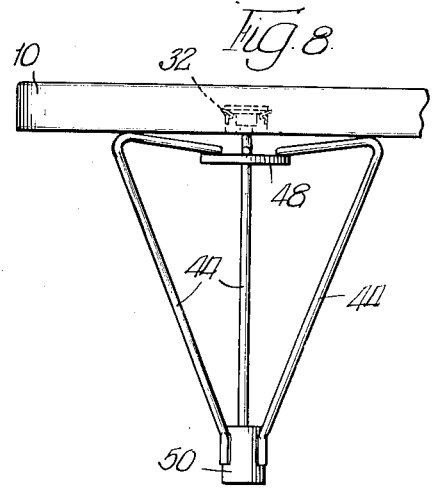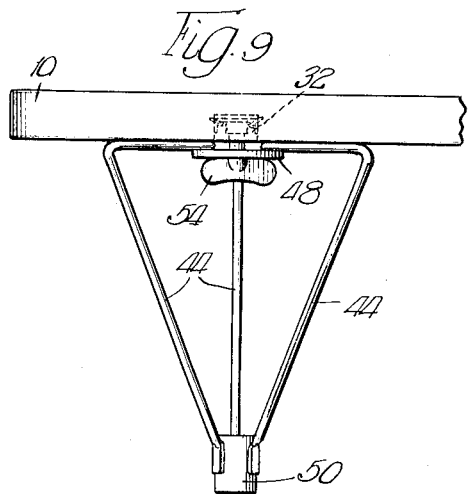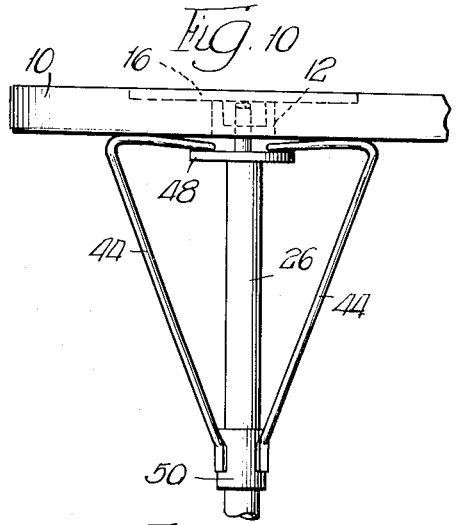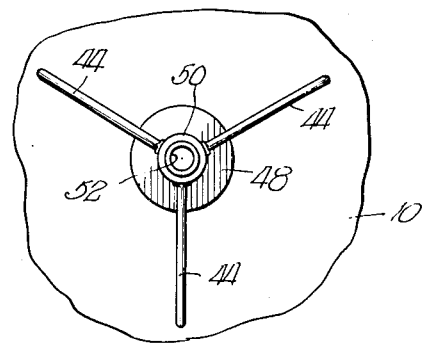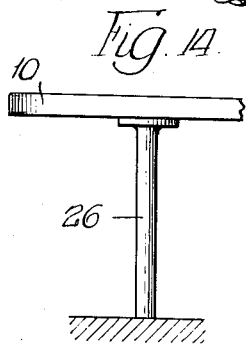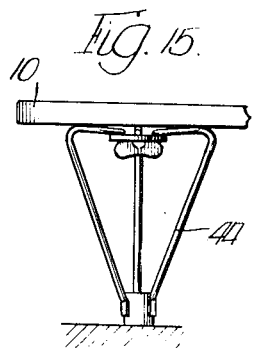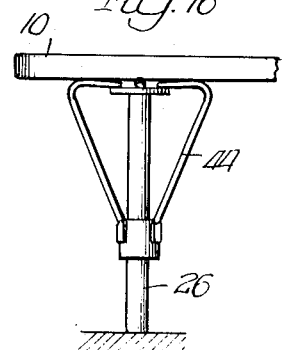

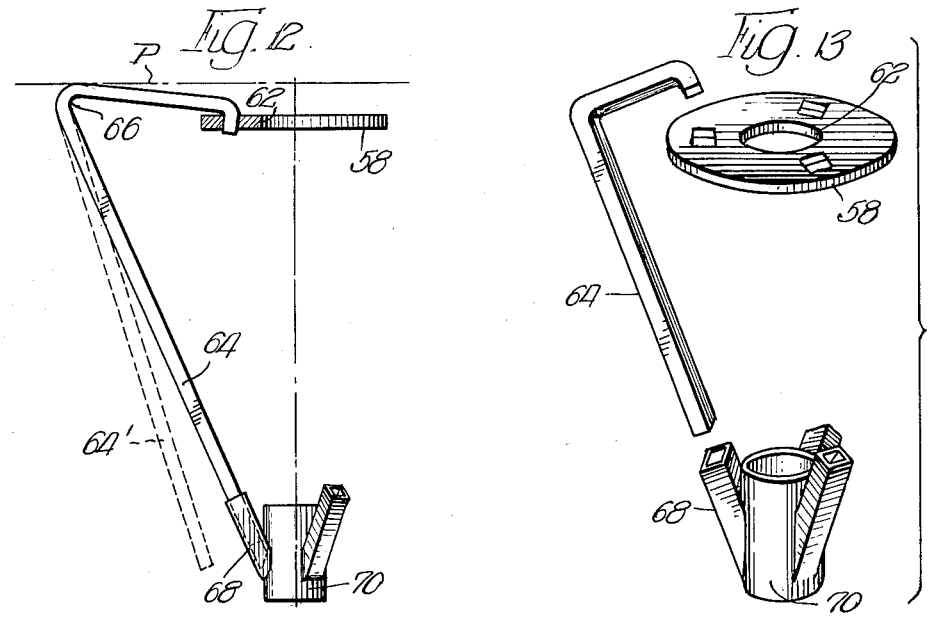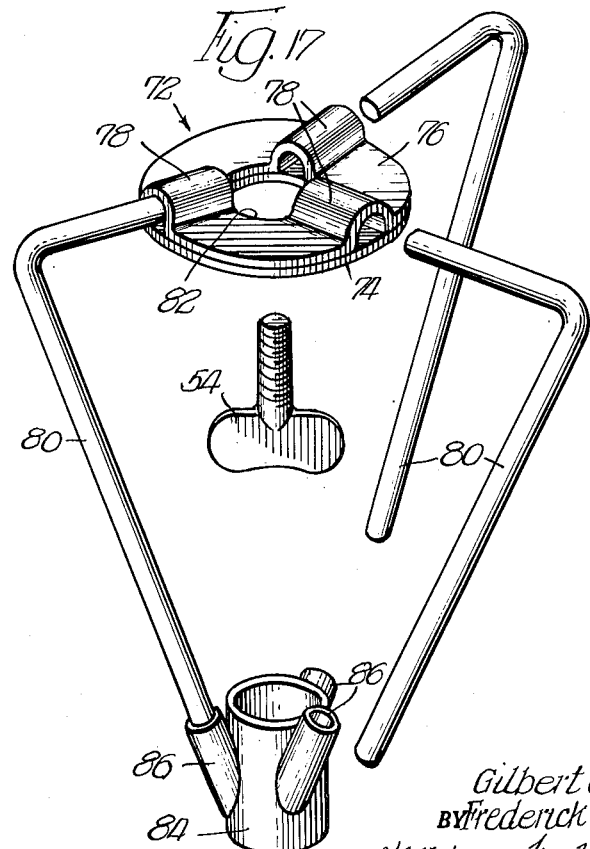

United States Patent Office 2,730,419
Patented Jan. 10, 1956

2,730,419

FURNITURE SUPPORT

Gilbert A. Watrous, San Diego, Calif., and Frederic A. Roberton, Oak Park, Ill.

Application September 18, 1951, Serial No. 247,038

12 Claims. (Cl. 311—110)

This invention relates to furniture construction, and more especially to means for rigidly connecting leg type supports to platforms, such as table tops, chair seats, chest bottoms, and the like.

The primary object is the provision of leg devices made of readily available, inexpensive materials that may be assembled and joined to articles of furniture in a simple manner to afford sturdy support therefor, and which may be readily disassembled therefrom when desired.

It is a corollary object to incorporate in a leg device for furniture a system of support which utilizes a stressing principle, so that as the devices are assembled and secured to the piece to be supported the parts are stressed to tighten and lock the assembly rigidly together.

It is a further object to provide leg supports that may be made interchangeable to alter the height at which the supported piece is maintained in relation to a supporting surface.

Another object contemplates the independent adjustment of the leg supports to maintain the platform being supported in level attitude without regard to the minor irregularities of the supporting surface.

In the following specification and claims occasional use is made of the term "platform" to indicate the member to which the leg devices are joined. This term is intended to cover, in addition to table tops to which it obviously applies, any structural surface or member of a piece of furniture to which it is customary or desirable to attach leg supports, and thus is intended to include chests, chairs, desks, bureaus, cabinets, and the like, as well as tables.

Several preferred embodiments of the present invention are shown in the accompanying drawings, in which—

Figure 1 is a fragmentary side elevational view illustrating one form of the invention;

Figures 2 and 3 are fragmentary elevational views corresponding to Figure 1, shown partly in section, illustrating the embodiment of the invention shown in Figure 1 and a modification thereof, respectively.

Figure 4 is a fragmentary exploded view of the construction shown in Figures 1 and 2;

Figure 5 is an exploded perspective view of one of the structural details embodied in the invention;

Figure 6 is a mid-sectional elevation of the device shown in Figure 5 as assembled;

Figure 7 is a perspective view of a brace made in accordance with the present invention;

Figures 8, 9 and 10 are reduced elevational views of the brace attached to a platform;

Figure 11 is a bottom plan view of such a brace;

Figures 12 and 13 are detail views of a modification of the brace construction;

Figures 14, 15 and 16 are reduced fragmentary side elevational views of legs fastened to a platform in accordance with the present invention; and Figure 17 is a further modification of the invention shown in partially assembled perspective view.

Referring now more particularly to the drawings, in Figures 1 to 4, the body to be supported, represented by a platform 10 in these views, is provided with a cylindrical opening 12, which extends through the platform between its top and bottom surfaces. The top surface of the platform is provided with a countersink 14 circumjacent the opening 12 and coaxial therewith. Disposed within the countersink is a plate 16 of complementary size and shape, so that its top surface is essentially flush with the top surface of the platform 10, as is shown in Figure 2.

Dependent within the opening 12 from the top plate 16 is a projection 18, which in the illustrated embodiment is provided with internal threading 20, for reasons presently to appear. A bottom plate 22, having an aperture 24 in its central portion, is placed in underlying relation to the opening 12, and a leg column 26 having a screw-threaded fastening element 28 affixed to its upper end is abutted against the bottom plate 22, so that the threaded portion 28 extends through the aperture 24 in the plate into engagement with the threaded projection 18 as appears in Figure 2. As the leg column 26 is turned to tighten the screw connection between the top plate and the leg column, the threaded extension on the leg column is placed under tension, which in turn introduces a reactive compression component between the top and bottom plates which places the platform 10 therebetween under compression and locks the leg column securely thereto.

As shown in Figure 3, the countersink 14 is provided with a conically flared beveled portion 30 around its rim, and in this instance the top plate 16 is beveled around its edge as at 31, so as to have a complementary taper to that of the rim of the countersink. In this embodiment, the depth of the countersink is greater than the thickness of the plate 16, so that some latitude of adjustment is permitted in the axial disposition of the several parts by the screwing or unscrewing of the leg column relative to the top plate. By virtue of a camming action realized between the conically flared surfaces 30 and 32, the effective length of the leg column may be varied without appreciably destroying the flush relationship of the top of the plate 16 with the top of the platform 10. An axial adjustment by which the effective length of the leg column may be varied is thus realized.

In relation to Figures 5 and 6 there is shown a type of fastening, commonly called a "Wood-Loc," which may be employed instead of the cap plate 16. In this instance, a blind bore 32 is provided at the bottom surface of the platform 10 partially to penetrate the latter, but not to go completely through the same. A threaded fastening 34 is inserted into the bore, so that its platform 36 engages the end of the latter, and against which it is held by a deformable clinching element 38, which is driven into engagement therewith, so that its pointed projections 40 are caused to turn outwardly and enter the side walls of the blind bore 32, as shown in Figure 6. The wall portions of the element 38 buckle in at their weakened portions, as is determined by the peripheral holes, in order to seat firmly against the element 34 to lock it in position as shown in this figure.

In the example given, a threaded shank 42 on the fastening provides the same relationship to the threaded fastening associated with the leg device as obtains in the case of that shown in Figures 1 to 4 inclusive.

In the foregoing description and in that which is to ensue, it will be understood that either type of fastening may be employed interchangeably in the practice of the present invention.

It will be further understood that instead of interengaging threads between the several parts as hereinbefore described, other suitable types of fastening arrangements may be provided, such as bayonet locks or snap fasteners, etc.

In Figures 7 to 11 inclusive, there is shown a modified form of leg device, which may be used as a leg per se, or which may be used as a brace for a leg column, such as the element 26 in the preceding description. As shown in these views, three or more brace elements 44 are bent as at 46, adjacent their middles, to dispose their upper ends in radiating relation to a washer-like plate 48, and so as to cause their lower ends to converge upon a ferrule 50, which is preferably in the form of an open-ended tubular section. The plate 48 is provided with an aperture 52 adjacent its middle and so corresponds to the bottom plate 22 previously described in connection with Figures 1 to 4 inclusive.

The brace elements 44 are preferably welded to the plate 48 and to the ferrule 50, so as to provide an arrangement wherein the plate 48 is maintained in spaced relation to the bottom of the platform against which it is to be disposed, and which corresponds to a plane falling tangent to the outside of the bends 46. A wing-nut or other suitable fastening device 54 may be applied through the opening 52 in the plate 48 and engage with the threaded projection corresponding to 18 in Figure 2 or 42 in Figure 5, in relation to which it is tightened to draw the plate 48 toward the bottom surface of the platform 10. It will be observed that the ultimate position is represented by that shown in Figure 9, in which the plate 48 has been drawn as close as the relationship of the parts will permit, to the platform 10, and in so doing has moved the radial portions of the braces 44 into proximate parallelism with the platform, and which, by virtue of the resilient stock of which the braces are made, places these elements under stress and causes the lower ends thereof to bear compressively upon the ferrule 50.

If the ferrule is divided as along lines 56, Figure 7, so that the bottom end of each brace is accommodated by a segment of a tube, that is, in spaced relation to the other segments, then such stress is effective to close the segments upon each other and to embrace any element held therein, as, for instance, the leg column 26 disposed as in Figure 10.

For most purposes, the braces 44 are made from quarter-inch round carbon steelstock, which provides the requisite strength and resilience to perform the flexing and stressing contemplated here. Instead of the wing-nut or other type of fastening as shown in Figures 7 and 9, the leg column 26, similar to that shown in Figures 1 to 4, may be engaged with the fastening 18 or 42, as the case may be, so as to draw the plate 48 toward the platform, thus placing the braces under stress and causing the fastenings and contiguous portion of the leg to be tensioned, and adjacent portions of the platform to be reactively compressed thereby.

The resilience and normal displacement of the braces 44 is such as to afford considerable latitude in the securing or unsecuring of the leg column 26 relative to the fastening on the platform. By this means the effective length of the leg column may be varied to compensate for irregularities in the supporting surface, while maintaining the parts in rigid relation against the resilient force of the prestressed braces.

In the modifications shown in Figures 10 and 13, the bracing construction shown in Figure 7 is made of several parts, which may be assembled and disassembled as required. In this case, the washer or plate 58 is provided with a plurality of square apertures 60, which are grouped in the required number symmetrically around the central opening 62 therein. The brace elements 64 are of comparable gauge and material to those described in the case of Figure 7, but in this instance are preferably of square stock which is adapted to fit in nonturning relation in the openings 60 in the plate 58. The stock is bent at 66 in a manner previously described, so that the plate 58 is maintained in normal offset relation to a plane P, which falls tangent to the outside curvature of the bend 66, and which corresponds to the bottom of the platform to be supported. The lower ends of the square braces 64 are accommodated in sockets 68, which are square tubular sections welded or otherwise mounted around the ferrule 70. It is not necessary that these sockets be square, since at the lower portion of the assembly, both the braces 64 and the sockets 68 for their accommodation may be of round stock. However, it is essential that the upper ends of the braces be square in this type of arrangement for the accommodation of the square aperture 60 in the plate 58, in order to prevent skewing when the brace is assembled and tightened in operative position.

Therefore, since it is necessary to use other than round stock at one end of the brace elements, it is believed convenient to carry this configuration throughout, and hence there is illustrated in Figures 12 and 13 the sockets 68, which are also square. As assembled in the plate 58, the brace elements 64 spring outwardly as at 64' in Figure 12.

When all braces are assembled at their upper ends in the plate 58, the lower ends are forced from the outer positions, indicated at 64' in broken lines in Figure 12, into a position where they conform to and enter into the socket 68 in the ferrule, into which they are sprung and forced home. This imparts the necessary bias to afford the spacing between the plate 58 and the tangent plane P previously mentioned.

When the braces of Figures 12 and 13 are applied as mentioned in connection with the preceding figures, the plate 58 is urged toward the bottom surface of the platform to impose binding stresses upon the several parts, thereby effectively to lock them together.

Another form of knockdown leg construction employing round stock for the brace elements appears in Figure 17. Here the central plate 72 is a composite structure having a bottom bearing plate 74 and a top bearing plate 76 welded or brazed thereto. The top plate has offsets formed therein to constitute brace receiving sockets 78 which hold the braces 80 against twisting and turning when disposed therein. A central aperture 82 accommodates the fastening element 54 as previously described. The ferrule 84 has tubular sockets 86 to accommodate the bottoms of the braces which are biased therein as above stated. Since the brace stock is round, the sockets 86 likewise are round, since, with the type of plate 72 illustrated, the braces cannot shift or skew upon being assembled and tightened into position.

As shown in Figure 14, the platform 10 is supported by a leg 26 made in accordance with Figures 1 to 4 of the drawings. This type of construction is suitable for short leg tables and light burdens, as are typified by the conventional coffee-table. Similarly, in Figure 15 the platform 10 is supported by a leg device composed of the braces 44, as shown in Figure 7 and as applied in Figure 9. The height of such braces is sufficient for the usual coffee or cocktail table, and the strength of the brace is adequate for heavier burdens, such as those represented by chests of drawers, etc.

In Figure 16 the principle of Figure 10 is embodied to provide a higher table embodying the constructions of both Figures 14 and 15, comprising a leg column 26 and a leg structure 44 for the platform 10, made necessary by the increased length of the leg column 26 to elevate the platform to normal table height, or corresponding usage.

It will be understood that rubber cups or cork-type ferrule inserts may be used at the lower extremities of any of the leg constructions herein shown.

We claim:
1. Furniture construction comprising a platform, an opening in said platform having access to the relative bottom surface thereof, a fastening device secured in said opening, a perforate plate disposed below and adjacent said opening in axial alignment therewith, a plurality of elongated brace elements connected to and radiating from said plate outwardly and slightly upwardly abutting said platform, said brace members normally maintaining said plate spaced from said platform, said brace elements being bent adjacent their middles to a point of convergence below said plate and axially aligned therewith, a ferrule joining said converged elements together, and means cooperative with said fastening device to bias said plate toward the bottom surface of said platform.

2. Claim 1 in which said means is connected to the upper end of a leg column that is embraced by said ferrule.

3. Claim 2 in which said fastening device and cooperative means are interengaging male and female screw threads, respectively, whereby the effective length of said leg column may be varied by relatively screwing and unscrewing the interengaged threads.

4. Furniture construction having at least three legs constructed in accordance with claim 3, said interengaged threads constituting means for leveling said platform in relation to a supporting surface.

5. Furniture support construction comprising a threaded element fastenable to a body to be secured, a leg device having a threaded member associated therewith that is complementary to said threaded element and engageable therewith, a plate at the extremity of said leg device through which said threaded element and member are engaged, said plate constituting a compression member coactive against such a body when said element and member are tightened together to tension said leg device into firm engagement therewith, said threaded element comprising a bearing plate having a threaded projection thereon, said bearing plate being adapted to engage a surface of the body to be supported opposite to that against which said compression member plate bears, said threaded projection extending inwardly of such a body for engagement with said complementary threaded member, the edge of said bearing plate being flared as the segment of a cone whose apex lies on the same side thereof as said threaded projection and coaxial with the latter.

6. The invention described in claim 5, in which said leg device comprises at least three brace elements radiating outwardly from said plate and being bent intermediately of their ends symmetrically to a point of convergence, said brace elements at their converging ends being connected to a ferrule.

7. The invention described in claim 6, in which a leg column is extended through said ferrule, said column having said threaded member affixed to its end proximate to said plate.

8. The invention described in claim 6, in which the bends in said brace elements are sufficiently acute to dispose said plate in spaced relation to a plane lying tangent to the outside curvature of said bends on the ferrule side of said plane.

9. The invention described in claim 8, in which said brace elements are demountable with respect to said plate and ferrule whereby said leg device can be dismantled into its constituent parts.

10. Furniture construction comprising a platform, an opening through said platform between its top and bottom surfaces, a countersink circumjacent said opening in the top surface thereof, a top plate complementary in size and shape to said opening disposed therein so as to dispose its top surface essentially flush with that of said platform, a projection depending from said plate extending into said opening having fastening means associated therewith, a leg device having fastening means complementary to said fastening means of said projection interengaging therewith, a bottom plate interposed between said leg device and platform reactive to tension imposed by said fastening means to compress said platform between said top and bottom plates, said countersink being deeper than said top plate is thick and having a conical flared beveled portion around its rim, said plate having a complementary tapered edge in engagement with said beveled rim portion, said interengaged fastening means comprising screwthreads that may be loosened or tightened to vary the effective length of said leg device, the loosening and tightening of said screwthreads being compensated for by relative movement between the conically flared surfaces at the rim of said countersink and on the edge of said top plate.

11. Furniture construction comprising a platform to be supported, a blind bore entering said platform from its bottom surface, a fastening clinched into said bore on the "Wood-Loc" principle, a perforate plate closing said blind bore, a leg device, a fastening device complementary to said clinched fastening associated with said leg device and extending through said perforate plate for interengagement with said clinched fastening rigidly to secure said platform and leg device together, said leg device comprising at least three resilient metal braces connected at one of their ends to said perforate plate and radiating symmetrically therefrom, said braces being bent intermediate their ends to a point of convergence, a ferrule uniting the converged end of said braces, said plate when unsecured being spaced from said platform by said braces, and being biased toward said platform by the interengagement of said fastening means.

12. The invention as described in claim 11, including a leg column, and said complementary fastening device being affixed to one end of said column, said column being disposed within said ferrule and extending to engage said fastening device with said clinched fastening to one side of said ferrule, and extending to a foot portion at the other side thereof.

References Cited in the file of this patent

UNITED STATES PATENTS

| | | |
|---|---|---|
| 624,662 | Leedy | May 9, 1899 |
| 649,697 | Klokner | May 15, 1900 |
| 705,653 | Davis | July 29, 1902 |
| 1,094,900 | Hoit | Apr. 28, 1914 |
| 1,391,857 | Schmitt | Sept. 27, 1921 |
| 1,510,529 | Simenowsky | Oct. 7, 1924 |
| 1,590,586 | McDonald | June 29, 1926 |
| 1,671,757 | Allen | May 29, 1928 |
| 1,675,827 | Sharader | July 3, 1928 |
| 1,885,635 | Schweitzer | Nov. 1, 1932 |
| 2,081,031 | Berger | May 18, 1937 |
| 2,099,450 | Meyer | Nov. 16, 1937 |
| 2,420,471 | Engel | May 13, 1947 |
| 2,562,022 | Duer | July 24, 1951 |
| 2,602,012 | Doty | July 1, 1952 |
| 2,657,888 | Erickson | Nov. 3, 1953 |

FOREIGN PATENTS

| | | |
|---|---|---|
| 7,947 | Great Britain | 1890 |
| 984,254 | France | July 4, 1951 |